US012567108B2

(12) United States Patent (10) Patent No.: US 12,567,108 B2
Claus et al. (45) Date of Patent: *Mar. 3, 2026

(54) SYSTEM AND METHOD FOR MATCHING TRADING ORDERS BASED ON PRIORITY

(71) Applicant: BGC PARTNERS, INC., New York, NY (US)

(72) Inventors: Matthew W. Claus, Summit, NJ (US); Kevin M. Foley, New York, NY (US); Joseph C. Noviello, Summit, NJ (US); Howard W. Lutnick, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 18/211,657

(22) Filed: Jun. 20, 2023

(65) Prior Publication Data

US 2023/0334566 A1 Oct. 19, 2023

Related U.S. Application Data

(63) Continuation of application No. 17/337,471, filed on Jun. 3, 2021, now Pat. No. 11,720,965, which is a
(Continued)

(51) Int. Cl.
| | |
|---|---|
| *G06Q 40/00* | (2023.01) |
| *G06Q 40/04* | (2012.01) |
| *G06Q 40/06* | (2012.01) |

(52) U.S. Cl.
CPC ............. *G06Q 40/04* (2013.01); *G06Q 40/06* (2013.01)

(58) Field of Classification Search
CPC ...................................................... G06Q 40/04
See application file for complete search history.

(56) References Cited

U.S. PATENT DOCUMENTS

| | | | |
|---|---|---|---|
| 7,035,819 B1 * | 4/2006 | Gianakouros | .......... G06Q 20/10 705/37 |
| 7,165,041 B1 * | 1/2007 | Guheen | .............. G06Q 30/0601 705/26.1 |

(Continued)

OTHER PUBLICATIONS

Restructuring institutional block trading: an overview of the OptiMark system, IEEE 1998 (Year: 1998).*
Electronic trading in financial markets (Year: 2003).*

*Primary Examiner* — Bruce I Ebersman

(57) ABSTRACT

A system for managing trading orders comprises a memory to store a first trading order for a particular trading product, wherein the first trading order comprises display and reserve portions and is received from a first trader. The memory may store a second trading order for the particular trading product, wherein the second trading order comprises display and reserve portions and is received from a second trader after the first trading order. A processor of the system communicatively coupled to the memory may receive from a counterparty trader a counterorder for the trading product. The processor may use the counterorder to fill the display portions respectively of the first and second trading orders. After filling the display portion of the second trading order, the processor may exclusively offer at least a portion of the counterorder to the first trader for a configurable period of time.

11 Claims, 10 Drawing Sheets

Related U.S. Application Data continuation of application No. 16/553,520, filed on Aug. 28, 2019, now Pat. No. 11,030,693, which is a continuation of application No. 13/940,627, filed on Jul. 12, 2013, now Pat. No. 10,424,015, which is a continuation of application No. 11/499,833, filed on Aug. 3, 2006, now Pat. No. 8,494,951.

(60) Provisional application No. 60/706,109, filed on Aug. 5, 2005.

(56) References Cited

U.S. PATENT DOCUMENTS

| | | | | |
|---|---|---|---|---|
| 7,231,363 | B1 * | 6/2007 | Hughes | G06Q 30/0601 705/26.1 |
| 7,584,137 | B2 * | 9/2009 | Pham | G06Q 40/04 705/37 |
| 7,676,421 | B2 * | 3/2010 | Tilly | G06Q 40/06 705/37 |
| 7,747,493 | B1 * | 6/2010 | Monroe | G06Q 40/04 705/36 R |
| 7,818,191 | B2 * | 10/2010 | Lutnick | G06Q 30/0633 705/26.8 |
| 7,970,680 | B2 * | 6/2011 | Noviello | G06Q 40/04 705/35 |
| 8,494,951 | B2 * | 7/2013 | Claus | G06Q 40/04 705/37 |
| 8,521,635 | B2 * | 8/2013 | Olsson | G06Q 40/04 705/37 |
| 8,566,213 | B2 * | 10/2013 | Sweeting | G06Q 40/04 705/37 |
| 8,799,138 | B2 * | 8/2014 | Keith | G06Q 40/04 705/37 |
| 9,805,417 | B2 * | 10/2017 | Kemp, II | G16H 40/20 |
| 2019/0385233 | A1 * | 12/2019 | Claus | G06Q 40/06 |

* cited by examiner

SYSTEM AND METHOD FOR MATCHING TRADING ORDERS BASED ON PRIORITY

CROSS REFERENCE TO RELATED APPLICATIONS

This patent application is a continuation of U.S. patent application Ser. No. 17/337,471 filed Jun. 3, 2021, which is a continuation of U.S. patent application Ser. No. 16/553,520 filed Aug. 28, 2019 (now U.S. Pat. No. 11,030,693 issued Jun. 8, 2021), which is a continuation of U.S. patent application Ser. No. 13/940,627 filed Jul. 12, 2013 (now U.S. Pat. No. 10,424,015 issued Sep. 24, 2019), which is a continuation of U.S. patent application Ser. No. 11/499,833 filed Aug. 3, 2006 (now U.S. Pat. No. 8,494,951 issued Jul. 23, 2013), which claims the benefit of U.S. Provisional Application No. 60/706,109 filed Aug. 5, 2005, each of which is incorporated by reference herein in its entirety.

TECHNICAL FIELD OF THE INVENTION

The present invention relates generally to electronic trading and more specifically to a system and method for matching trading orders based upon priority.

BACKGROUND OF THE INVENTION

In recent years, electronic trading systems have gained widespread acceptance for the trading of a variety of items, such as goods, services, financial instruments, and commodities. For example, electronic trading systems may facilitate the trading of financial instruments and commodities such as stocks, bonds, currency, futures contracts, oil, and gold.

Generally, an electronic trading system receives and processes trading orders from traders. For example, an electronic trading system may process trading orders by matching buy orders for a particular item with sell orders for the same item. In placing a trading order, a trader may indicate that only a portion of the trading order should be displayed to other traders. This portion is referred to as the "displayed quantity." An electronic trading system generally comprises rules that dictate the sequence in which trading orders are processed. These rules, however, often decrease or hinder the liquidity of trading products.

SUMMARY OF THE INVENTION

In accordance with the present invention, the disadvantages and problems associated with prior electronic trading systems have been substantially reduced or eliminated.

In some embodiments, a system for managing trading orders comprises a memory operable to store a first trading order for a particular trading product, wherein the first trading order comprises a display portion and a reserve portion and is received from a first trader. The memory is further operable to store a second trading order for the particular trading product, wherein the second trading order comprises a display portion and a reserve portion and the second trading order is received from a second trader after the first trading order. The system further comprises a processor communicatively coupled to the memory and operable to receive from a counterparty trader a counterorder for the trading product. The processor is further operable to use the counterorder to fill the display portion of the first trading order. The processor is further operable to use the counterorder to fill the display portion of the second trading order. After filling the display portion of the second trading order, the processor is further operable to exclusively offer at least a portion of the counterorder to the first trader for a configurable period of time.

In some embodiments, a method for managing trading orders comprises receiving from a first trader a first trading order for a particular trading product, wherein the first trading order comprises a display portion and a reserve portion. The method continues by subsequently receiving from a second trader a second trading order for the particular trading product, wherein the second trading order comprises a display portion and a reserve portion. The method continues by receiving from a counterparty trader a counterorder for the trading product. The method continues by using the counterorder to fill the display portion of the first trading order. The method continues by using the counterorder to fill the display portion of the second trading order. After filling the display portion of the second trading order, the method concludes by exclusively offering at least a portion of the counterorder to the first trader for a configurable period of time.

The invention has several important technical advantages. Various embodiments of the invention may have none, some, or all of these advantages. One technical advantage is that the trading platform reduces network traffic and increases throughput in an electronic trading system. In particular, the trading platform is operable to automatically match a particular counterorder with the display portions of multiple orders. In a system that is unable to automatically match a particular counterorder with the display portions of multiple orders, the system must generally receive multiple counterorders and/or transmit multiple confirmation messages prior to filling the display portions of multiple orders. Because the present trading platform does not need to receive multiple counterorders or transmit multiple confirmation messages to fill the display portions of multiple orders, the trading platform reduces network traffic and increases data throughput.

Another advantage is that the trading platform assists traders in managing the risks of trading. In some embodiments, a trader may perceive that disclosure of an entire trading order to other traders may adversely affect market prices for a particular trading product. As a result, the trading platform allows a trader to designate part of a trading order as the display portion and the remaining part of the trading order as the reserve portion. The trading platform may immediately disclose the display portion to other traders while preventing the disclosure of the reserve portion until one or more conditions are satisfied. By allowing traders to configure trading orders with display portions and reserve portions, the trading platform may assist traders in managing the risks of trading.

Another advantage is that the trading platform may create incentives for traders to increase liquidity and transparency in an electronic trading system. Upon submitting a particular trading order, a trader may not know whether the particular trading order will have priority relative to other trading orders. In the present trading system, however, the trading platform is operable to fill the display portions of multiple trading orders prior to granting priority privileges to any particular trader. Thus, a particular trader in the present system may know that the display portion of his or her order will likely be filled prior to any other trader receiving priority status. As a result, the particular trader may perceive an advantage in increasing the size of the display portion of the particular order. Thus, trading system creates incentives for traders to submit orders with larger display portions.

Receiving orders with larger display portions increases transparency and liquidity in the trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
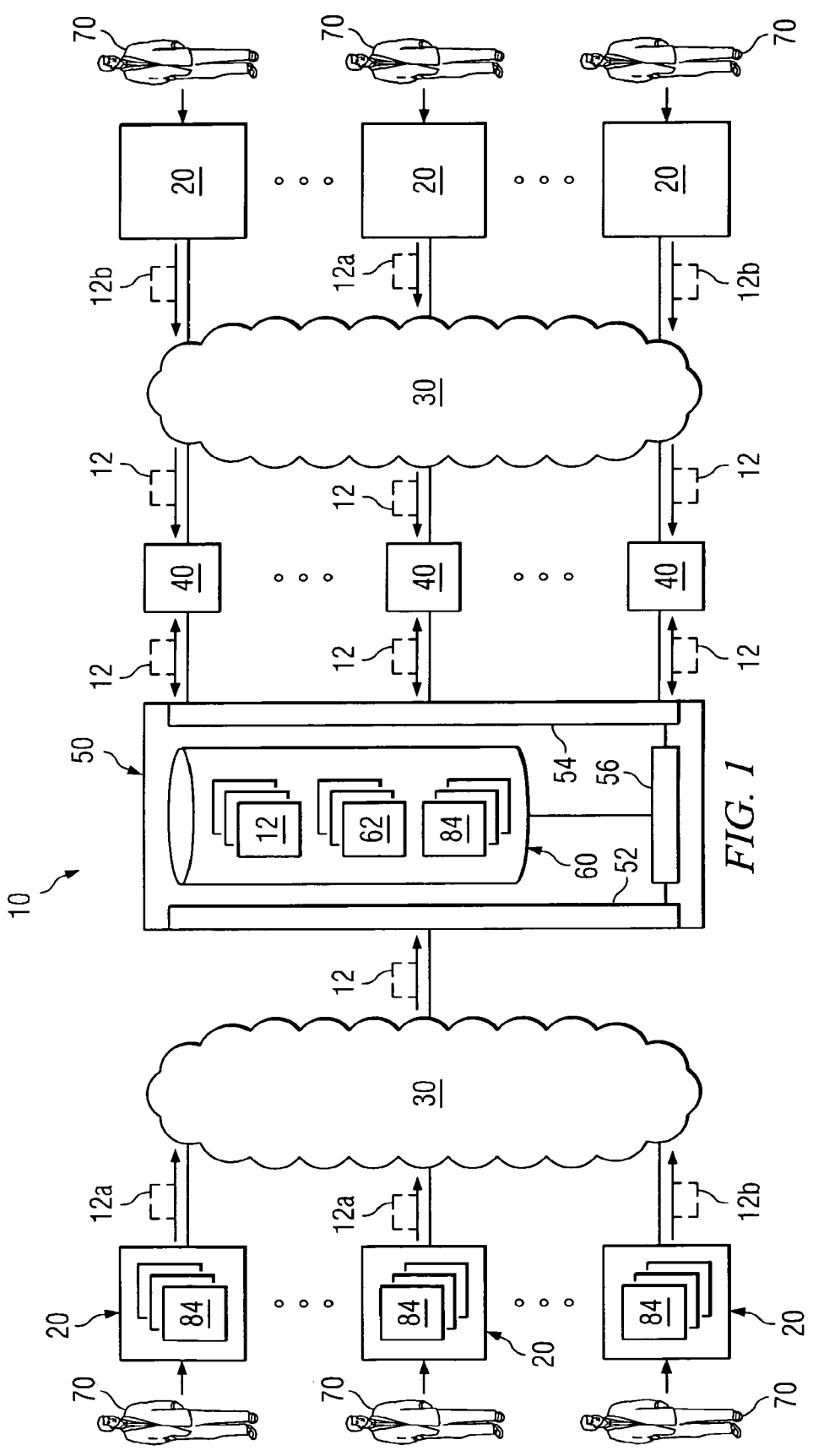
FIG. 1 illustrates one embodiment of a trading system in accordance with the present invention.

FIG. 1 illustrates one embodiment of a trading system 10. Trading system 10 may comprise a trading platform 50 communicatively coupled to clients 20, networks 30, and market centers 40. Generally, trading system 10 is operable to receive, route, and execute trading orders 12 from traders 70. In some embodiments, trading orders 12 may represent orders 12a and counterorders 12b. Each order 12a or counterorder 12b may comprise a display portion and a reserve portion. Trading platform 50 may use a particular counterorder 12 to fill the display portions of multiple orders 12. After filling the display portions of multiple orders 12a, trading platform 50 may exclusively offer a portion of the particular counterorder 12b to a particular trader 70. By filling the display portions of orders 12a prior to exclusively offering a portion of the counterorder to a particular trader 70, trading platform 50 may create incentives for traders 70 to display larger portions of orders 12a. Receiving orders 12a with larger display portions may increase transparency and liquidity in trading system 10.

Trading system 10 may comprise a plurality of clients 20. Clients 20 represent any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 10. Client 20 may also comprise any suitable user interface such as a display, microphone, keyboard, or any other appropriate terminal equipment according to particular configurations and arrangements. It will be understood that there may be any number of clients 20 communicatively coupled to trading platform 50. In addition, there may be any number of clients 20 communicatively coupled to market centers 40 without using trading platform 50.

Clients 20 are operable to receive trading orders 12 from traders 70 and to send trading orders 12 to trading platform 50 and/or market centers 40. Trading orders 12 may comprise orders to trade products such as, for example, currencies, financial instruments, stocks, bonds, futures contracts, equity securities, mutual funds, options, derivatives, commodities, or any number and combination of suitable trading products. In particular embodiments, trading order 12 may specify a target price for the trading product. Trading orders 24 may comprise bids, offers, market orders, limit orders, stop loss orders, day orders, open orders, GTC ("good till cancelled") orders, "good through" orders, "all or none" orders, "any part" orders, or any other suitable order for trading.

A particular trading order 12 may be referred to as an order 12a or a counter order 12b. Orders 12a and counterorders 12b represent complementary actions such as, for example, buying and selling. If the party that submits a particular order 12a is referred to as trader 70, the party that submits a corresponding counterorder 12b may be referred to as a "counterparty" trader 70. If a particular order 12a represents a buy order (e.g., bid, take, lift, etc.), then a corresponding counterorder 12b may represent a sell order (e.g., offer, hit, etc.). Conversely, if a particular order 12a represents a sell order, then a corresponding counterorder 12b may represent a buy order.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10. Certain traders 70 may be customers and other traders 70 may be market makers.

A market maker is any individual, firm, or other entity that submits and/or maintains either or both bid and offer trading orders 12 simultaneously for the same instrument. For example, a market maker may be a brokerage or bank that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

A customer may be any user of trading system 10 that is not a market maker. A customer may be an individual investor, an agent acting on behalf of a principal, a principal, an individual, a legal entity (such as a corporation), or any machine or mechanism that is capable of placing and/or responding to trading orders 12 in system 10.

In some embodiments, market makers may include individuals, firms or other entities that are granted particular privileges such that trading orders 12 received from such individuals, firms or other entities are treated as being received from a traditional market maker (such as a brokerage or bank, for example). For example, certain individuals, firms, or other entities that may otherwise be treated as customers may be granted privileges to be treated as market makers for the purposes of the systems and methods discussed herein. To receive market maker privileges, an individual, firm, or other entity may be required to pay a fee, pay a commission, or submit and/or simultaneously maintain both bid and offer trading orders 12 for particular instruments. According to certain embodiments, an individual, firm, or other entity may be designated as a market maker for particular instruments but as a customer for other instruments.

In some embodiments, a multi-tiered system of market makers may be employed. Trading platform 50 may grant different privileges to different market makers based on one or more criteria such as, for example, whether the market maker is associated with an electronic feed, whether the market maker is a strong trader, or whether the market maker has particular information. Market makers may be categorized into different tiers for different tradable instruments. For instance, a particular market maker may be categorized as a first-level market maker for instrument(s) for which that market maker is a strong trader and as a second-level market maker for other types of instruments.

Clients 20 may be communicatively coupled to trading platform 50 via network 30. Network 30 is a communication platform operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may further comprise any combination of the above examples and any local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40.

Market centers 40 comprise all manner of order execution venues including exchanges, Electronic Communication Networks (ECNs), Alternative Trading Systems (ATSs), market makers, or any other suitable market participants. Each market center 40 may maintain a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Market centers 40 may be communicatively coupled to trading platform 50 via network 30.

Trading platform 50 is a trading architecture that facilitates the routing, matching, and processing of trading orders 12. Trading platform 50 may comprise a management center or a headquartering office for any person, business, or entity that seeks to route, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Trading platform 50 is generally operable to route, process, transmit, and execute trading orders 12 from traders 70 and/or market centers 40. Trading platform 50 may allow trader 70 to submit trading order 12 comprising a display portion and a reserve portion. Upon receiving trading order 12, trading platform 50 may immediately disclose the display portion of trading order 12 to other traders 70 and/or to market centers 40. The disclosure of the display portion of trading order 12 may be achieved by transmitting, broadcasting, and/or displaying the display portion of trading order 12 to clients 20 associated with other traders 70 and/or to market centers 40. In contrast to the display portion of trading order 12, trading platform 50 may limit or prevent the disclosure of the reserve portion of trading order 12. In some embodiments, trading platform 50 may not disclose the reserve portion of trading order 12 until one or more conditions are satisfied. For example, trading platform 50 may be configured to not disclose the reserve portion of trading order 12 until the display portion of trading order 12 is filled. As another example, trading platform 50 may be configured to not disclose the reserve portion of trading order 12 until the volume of trading in trading system 10 reaches a configurable threshold. It should be understood that the condition(s) for disclosing the reserve portion of trading order 12 may be based on market data, time, trader preferences, thresholds, or any number and combination of suitable criteria.

Generally, trading platform 50 is operable to process trading orders 12 by filling orders 12a with one or more corresponding counterorders 12b. Filling an order 12a refers to matching, satisfying, filling, or exhausting that order 12a with one or more corresponding counterorders 12b. For example, if a particular order 12a is a buy order for product A with a display portion of 100 shares and if the counterorder 12b is a sell order of 500 shares of product A, then using counterorder 12b to fill the display portion of order 12a may comprise routing, assigning, earmarking, or transferring 100 shares of product A from counterorder 12b to the particular trader 70 associated with order 12a.

In some instances, trader 70 may designate the entirety of trading order 12 as the display portion. In other instances, trader 70 may designate part of a particular trading order 12 as the display portion and the remaining part of the particular trading order 12 as the reserve portion. In some embodiments, trader 70 may perceive that disclosure of the entire trading order 12 to other traders 70 might adversely affect market prices for the particular trading product. To reduce such a risk, trader 70 may choose to designate only part of trading order 12 as the display portion. By allowing traders 70 to configure trading orders 12 with display portions and reserve portions, trading platform 50 may assist traders 70 in managing the risks of trading.

Trading platform 50 is further operable to monitor the sequence in which trading orders 12 are received from traders 70 and/or market makers 40. In particular, trading platform 50 may fill the display portions of trading orders 12 according to the sequence in which trading orders 12 are received. In some embodiments, after filling the display portions of trading orders 12, trading platform 50 may exclusively offer at least a portion of a particular counterorder 12*b* to a particular trader 12. The particular trader 70 that is exclusively offered a portion of counterorder 12*b* may be referred to as the "priority trader" 70. In some embodiments, trading platform 50 determines the priority trader 70 based on the order in which trading platform 50 received trading orders 12.

The exclusive offer of counterorder 12*b* to priority trader 70 may last for a configurable period of time. This configurable period of time may be referred to as a priority period 82. The length of priority period 82 may be determined based on current market data, trader preferences, predetermined parameters, or any number and combination of suitable criteria.

Trading platform 50 may comprise client interface 52, market interface 54, processor 56, and memory module 60. Client interface 52 of trading platform 50 is communicatively coupled to network 30 and supports communications between clients 20 and the various components of trading platform 50. According to certain embodiments, client interface 52 comprises a transaction server that receives trading orders 12 communicated by clients 20 via network 30. Market interface 54 is communicatively coupled to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 communicatively coupled directly to trading platform 50.

Client interface 52 and market interface 54 are communicatively coupled to processor 56. Processor 56 is operable to record trading orders 12 in memory module 60 and route trading orders 12 to market centers 40. Processor 56 is further operable to execute rules 62 stored in memory module 60 to match orders 12*a* and counterorders 12*b* received by trading platform 50. Processor 56 may comprise any suitable combination of hardware and/or software implemented in one or more modules to provide the described function or operation. Processor 56 may be communicatively coupled to memory module 60.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory module 60 as internal to trading platform 50, it should be understood that memory module 60 may be internal or external to components of trading system 10, depending on particular implementations. Also, memory module 60 may be separate from or integral to other memory devices to achieve any suitable arrangement of memory devices for use in trading system 10. According to certain embodiments, memory module 60 may store rules 62 and trading orders 12.

Rules 62 comprises software instructions for routing, matching, processing, and/or filling trading orders 12. Processor 56 is operable to execute rules 62 to match orders 12*a* and counterorders 12*b*. Rules 62 may further comprise instructions for managing the sequence in which trading orders 12 are filled and for initiating one or more priority periods 82 for priority trader 70.

It should be understood that the internal structure of trading platform 50 and the interfaces, processors, and memory devices associated therewith is malleable and can be readily changed, modified, rearranged, or reconfigured to achieve the intended operations of trading platform 50.

In operation, trading platform 50 may manage the sequence in which counterorders 12*b* are used to fill the display portions and reserve portions of orders 12*a*. In particular, trading platform 50 may receive from traders 70 a plurality of orders 12*a* for a particular trading product. Trading platform 50 may monitor and record the sequence in which orders 12*a* are received. Trading platform 50 may further monitor and record which traders 70 are associated with which orders 12*a*. Trading platform 50 may subsequently receive a particular counterorder 12*b* for the particular trading product. Trading platform 50 may use the particular counterorder 12*b* to fill the display portions of each of the received orders 12*a* according to the sequence in which trading platform 50 received orders 12*a*. In other words, trading platform 50 may fill the display portion of a particular order 12*a* according to when that particular order 12*a* was received relative to the other orders 12*a*.

In some embodiments, if counterorder 12*b* is sufficient to fill the display portions of each of the received orders 12*a*, then trading platform 50 may designate the particular trader 70 that submitted the first order 12*a* as the priority trader 70. Trading platform 50 may initiate priority period 82 with respect to the priority trader 70. During priority period 82, trading platform 50 may exclusively offer all or part of the remaining portion of counterorder 12*b* to the priority trader 70. Exclusively offering all or part of the remaining portion of counterorder 12*b* may comprise making available, transmitting, or otherwise disclosing the remaining portion of counterorder 12*b* to the priority trader 70 without making available the remaining portion of counterorder 12 to the other traders 70 in trading system 10. In some embodiments, during priority period 82, trading platform 50 may not allow any trader 70 in trading system 10, besides the priority trader 70, to aggress against or to execute a trade involving the remaining portion of counterorder 12*b*. If, prior to the expiration of priority period 82, the priority trader 70 does not accept the portion of counterorder 12*b* exclusively offered, then trading platform 50 may disclose and/or make available to other traders 70 the remaining portion of counterorder 12*b*. In some embodiments, once priority period 82 expires, trading platform 50 may no longer consider the particular trader 70 to whom the exclusive offer was made to be the priority trader 70.

The display portion of a particular trading order 12 from a particular trader 70 may be determined based on one or more trader preferences 84 associated with the particular trader 70. In some embodiments, the one or more trader preferences 84 may be stored in one or more clients 20 associated with the particular trader 70. For example, trader 70 may input into client 20 trading order 12 for a total quantity of a particular trading product. Based at least in part on the one or more trader preferences 84 associated with trader 70, client 20 may automatically determine how much of the total quantity of trading order 12 to designate as the display portion and how much of the total quantity of trading order 12 to designate as the reserve portion. Trader preferences 84 may be based on any number and combination of suitable criteria. For example, trader 70 may be associated with trader preference 84 to set the display portion equal to a configurable percentage of the total quantity of trading order 12. In addition, or alternatively, trader preferences 84 may be based on configurable thresholds, current market data, trader history, or any number and combination of suitable criteria. The foregoing example describes client 20 as storing and using trader preferences 84 to automatically determine the display portion of trading order 12. It should be understood that these functions may be performed by trading platform 50 or by any other suitable component of trading system 10 without changing the function and operation of trading system 10.

Trading platform 50 may be further operable to determine how much of a particular counterorder 12b to offer to the priority trader 70 during priority period 82. In particular, trading platform 50 may use one or more trader preferences 84 associated with trader 70 that submitted the particular counterorder 12b to determine how much of the particular counterorder 12b to offer during priority period 82. For example, trader 70 associated with counterorder 12b may be associated with trader preference 84 to offer the entire remaining portion of counterorder 12b during priority period 82. As another example, trader 70 associated with counterorder 12b may be associated with trader preference 84 to offer a configurable percentage of the remaining portion of counterorder 12b during priority period 82. It should be understood that trader preferences 84 for determining how much of counterorder 12 to offer during the priority period may be based on market activity, configurable thresholds, trading histories, or any number and combination of suitable criteria.

In some embodiments, trading platform 50 may be operable to extend priority period 82 associated with a priority trader 70. In particular, if the priority trader 70 accepts, during priority period 82, the portion of counterorder 12b exclusively offered by trading platform 50, then trading platform 50 may extend priority period 82 for a configurable period of time. During the extended priority period, trading platform 50 may offer to the priority trader 70 an additional part of the remaining portion of counterorder 12b and/or may offer to the priority trader 70 one or more follow-on counterorders 12b. A follow-on counterorder 12b refers to a particular counterorder 12b received by trading platform 50 after the initial counterorder 12b. A follow-on counterorder 12b may be from the same trader 70 that submitted the initial counterorder 12b or from a different trader 70. According to certain embodiments, the priority trader 70 may retain priority status (e.g., extend priority period 82) for as long as the priority trader 70 continues to accept the exclusively offered counterorders 12b during an extendable priority period 82. In other embodiments, the priority trader 70 may not extend priority period 82 more than a configurable number of times (e.g., the priority trader 70 may not accept more than a configurable number of exclusively offered counterorders 12b before losing priority status).

FIGS. 2A-2E illustrate example timelines for processing trading orders 12 in trading system 10. Although the following examples describe trading orders 12 for a particular trading product, it should be understood that trading orders 12 may be for any suitable trading product such as, for example, currencies, financial instruments, stocks, bonds, futures contracts, equity securities, mutual funds, options, derivatives, commodities or any number and combination of suitable trading products. It should be further understood that the example timelines illustrated in FIGS. 2A-2E are not drawn to scale. These timelines are intended to depict sequences of events according to certain embodiments.

Certain events that are depicted in the example timelines as occurring sequentially may, in some embodiments, occur substantially simultaneously.

Figure 2A:
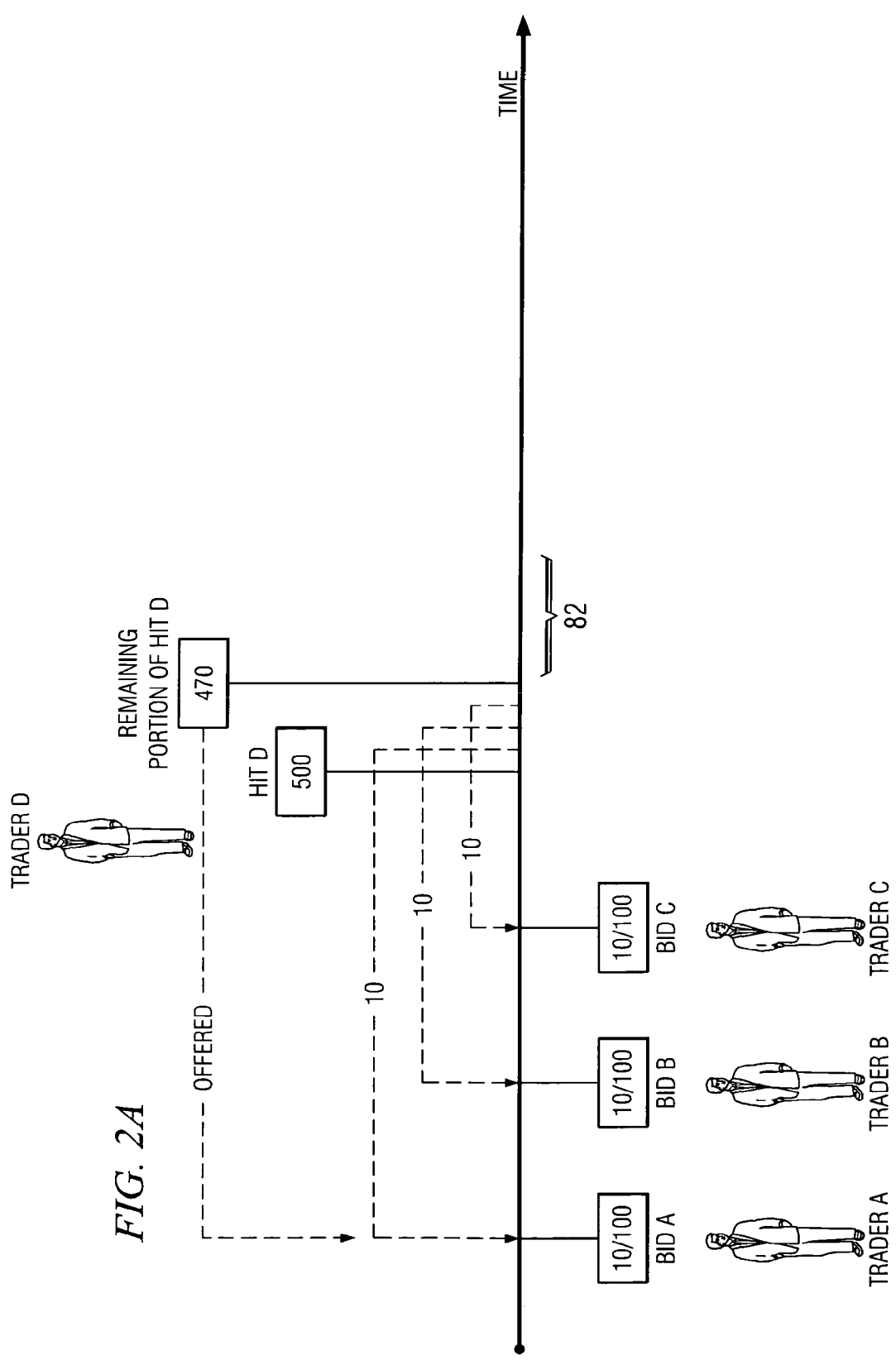
FIG. 2A illustrates an example timeline for matching trading orders according to one embodiment of the present invention.

FIG. 2A illustrates an example timeline for filling the display portions of orders 12a. In this example, trading platform 50 comprises two rules—Rule 62a and 62b. When trading platform 50 receives a plurality of orders 12a for a particular trading product followed by counterorder 12b for the particular trading product, Rule 62a directs trading platform 50 to use counterorder 12b to fill the display portion of each of the plurality of orders 12a according to the sequence in which orders 12a were received by trading platform 50. Once the display portions of the received orders 12a are filled, Rule 62b directs trading platform 50 to exclusively offer, for priority period 82, any remaining portion of counterorder 12b to the particular trader 70 associated with the first order 12a.

In the present example, trading platform 50 receives from Trader A bid A for 110 shares of product X. Order A is configured with a display portion of 10 shares and a reserve portion of 100 shares. Subsequently, trading platform 50 receives from Trader B bid B for 110 shares of product X. Trading platform 50 then receives from Trader C bid C for 110 shares of product X. Bids B and C are each configured with a display portion of 10 shares and a reserve portion of 100 shares. After receiving bid C, trading platform receives from Trader D a particular counterorder 12b—hit D—of 500 shares of product X.

In the present example, based on Rule 62a, trading platform 50 uses hit D to fill the display portions of bids A, B, and C based on the sequence in which trading platform 50 received bids A, B, and C. Consequently, trading platform 50 fills the display portion of bid A with 10 shares of product X from hit D. Trading platform 50 then fills the display portion of bid B with 10 shares of product X from hit D. Trading platform 50 next fills the display portion of bid C with 10 shares of product X from hit D. In the present example, after filling the display portions of bids A, B, and C, trading platform 50, based on Rule 62b, exclusively offers the remaining 470 shares of product X from hit D to Trader A. In this example, the exclusive offer of the remaining portion of hit D lasts for priority period 82, according to Rule 62b. In this example, during priority period 82, trading platform 50 does not disclose the 470 shares remaining in hit D to Traders B or C and/or does not allow Traders B or C to execute a trade involving the 470 remaining shares in hit D. Thus, Trader A has an exclusive opportunity during priority period 82 to execute a trade for the 470 shares remaining in hit D. If priority period 82 expires without Trader A executing a trade for the 470 remaining shares in hit D, then trading platform 50 may allow Trader B and/or Trader C to trade with Trader D for the 470 shares remaining in hit D.

Notably, upon submitting a particular order 12a to trading platform 50, a particular trader 70 may not know whether the particular order 12a will be the first such order 12a in trading platform 50 that will be waiting to be filled. Thus, the particular trader 70 may not know whether he or she will receive priority to fill the reserve portion of the particular order 12a with counterorder 12b. However, in the trading system 10 illustrated in the foregoing example, the particular trader 70 may know that the display portion of his or her order 12a will likely be filled prior to any other trader 70 receiving priority status. Thus, the particular trader 70 may perceive an advantage in increasing the size of the display portion of the particular order 12a. Thus, trading system 10 may encourage traders 70 to submit orders 12a with larger display portions. Receiving trading orders 12 with larger display portions may result in greater transparency and liquidity in trading system 10.

Figure 2B:
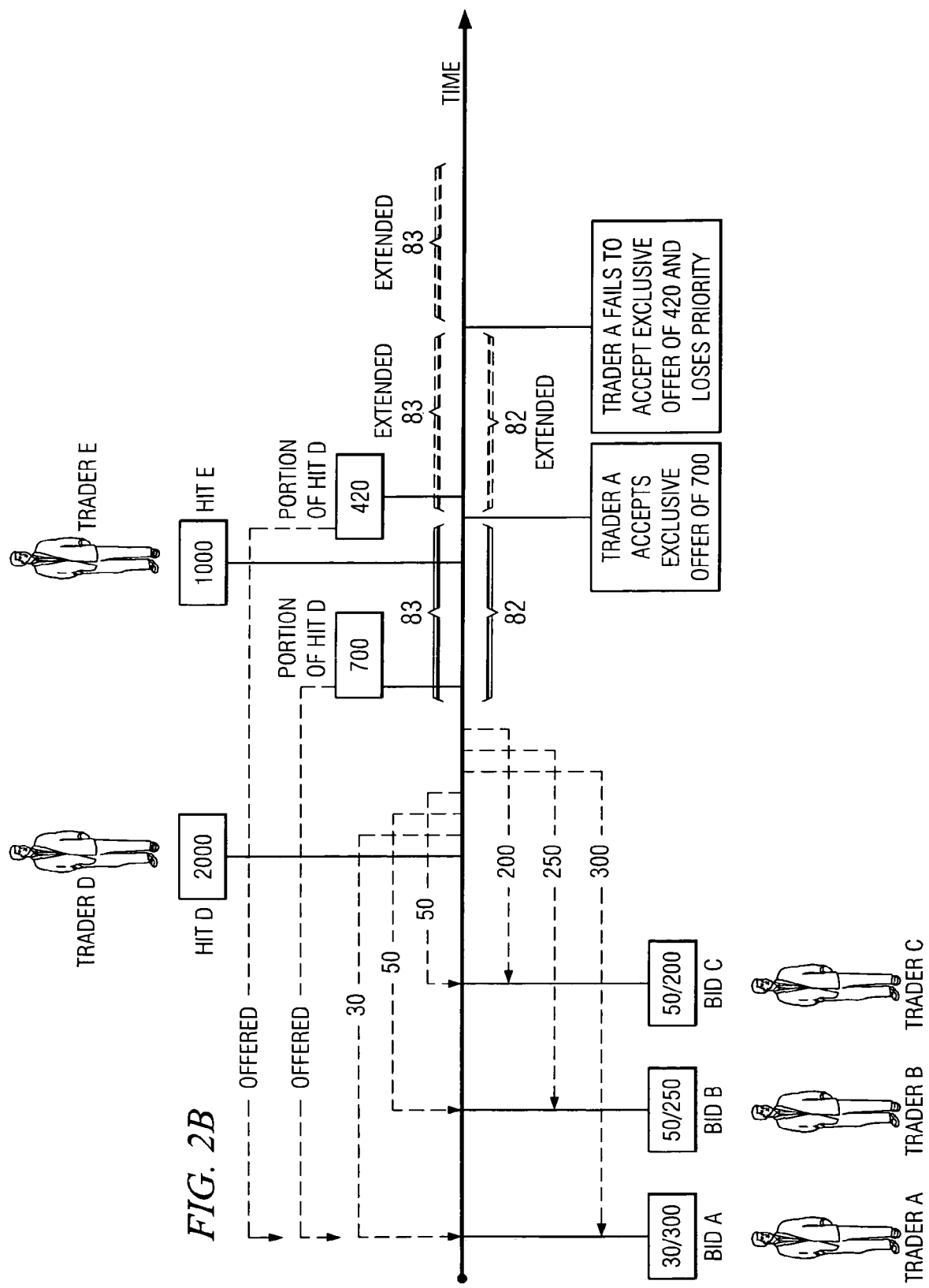
FIG. 2B illustrates an example timeline for matching trading orders according to one embodiment of the present invention.

FIG. 2B illustrates another example timeline for processing trading orders 12 in trading system 10. In the present example, trading platform 50 is operable to give priority status to trader 70 associated with counterorder 12*b*. As explained above, if the priority trader 70 does not accept, prior to the expiration of priority period 82, the portion of counterorder 12*b* exclusively offered, then the priority trader 70 may lose priority status and trading platform 50 may make available to other traders 70 the remaining portion of counterorder 12*b*. Although the priority trader 70 may lose priority status by declining to execute a trade for the remaining portion of counterorder 12*b*, trading platform 50 may grant to trader 70 associated with counterorder 12*b* a priority status relative to other traders 70 that submit follow-on counterorders 12*b*. The priority status of trader 70 associated with counterorder 12*b* may be represented as a counter priority period 83.

In the present example, trading platform 50 comprises four rules 62—Rules 62*a*, 62*b*, 62*c*, and 62*d*. When trading platform 50 receives a plurality of orders 12*a* for a particular trading product followed by counterorder 12*b* for the particular trading product, Rule 62*a* directs trading platform 50 to use counterorder 12*b* to fill the display portion of each of the plurality of orders 12*a* according to the sequence in which orders 12*a* were received by trading platform 50. Once the display portions of the received orders 12*a* are filled, Rule 62*b* directs trading platform 50 to fill the reserve portion of each of the plurality of orders 12*a* according to the same sequence. Once the reserve portions of the received orders 12*a* are filled, Rule 62*c* directs trading platform 50 to exclusively offer to the priority trader 70, for an extendable priority period 82, any remaining portion of counterorder 12*b* in increments of 700 units. Rule 62*d* directs trading platform 50 to initiate counter priority period 83 for the particular trader 70 associated with counterorder 12*b*. In this example, counter priority period 83 is extendable for as long as the particular trader 70 demonstrates a willingness to continue trading for the particular trading product.

In the present example, trading platform 50 receives from Trader A bid A for 330 shares of product X. Bid A is configured with a display portion of 30 shares and a reserve portion of 300 shares. Trading platform 50 subsequently receives from Trader B bid B for 300 shares of product X. Bid B is configured with a display portion of 50 shares and a reserve portion of 250 shares. Trading platform 50 then receives from Trader C bid C for 250 shares of product X. Bid C is configured with a display portion of 50 shares and a reserve portion of 200 shares. After receiving bid C, trading platform receives from Trader D hit D of 2000 shares of product X.

In the present example, based on Rule 62*a*, trading platform 50 uses hit D to fill the display portions of bids A, B, and C according to the sequence in which trading platform 50 received bids A, B, and C. Thus, trading platform 50 uses hit D to fill the display portions of bids A, B, and C with 30 shares, 50 shares, and 50 shares of product X, respectively. Then, based on Rule 62*b*, trading platform 50 uses hit D to fill the reserve portions of bids A, B, and C according to the sequence in which trading platform 50 received each bid. Thus, trading platform 50 uses hit D to fill the reserve portions of bids A, B, and D with 300 shares, 250 shares, and 200 shares of product X, respectively. At this point, 1120 shares of hit D remain. Based on Rule 62*c*, trading platform 50 exclusively offers to Trader A (for priority period 82) 700 shares of product X from hit D. In addition, based on Rule 62*d*, trading platform initiates an extendable counter priority period 83 for Trader D. In this example, during priority period 82, trading platform 50 receives from Trader E a follow-on counterorder 12*b*—hit E—of 1000 shares of product X. In the present example, Trader A executes a trade for the 700 shares of product X prior to the expiration of priority period 82. As a result, based on Rules 62*c* and 62*d*, trading platform 50 extends priority period 82 and counter priority period 83. During the extended priority periods, trading platform 50 offers the remaining 420 shares of product X from hit D to trader A. In the present example, prior to the expiration of extended priority period 82, Trader A fails to execute a trade for the remaining 420 shares of product X. As a result, Trader A loses priority status and is no longer considered by trading platform 50 to be a priority trader 70.

Counter priority period 83 of Trader D, however, is extended according to Rule 62*d* because Trader D has not declined to execute further trades for product X. Thus, trading platform 50 may give priority to hit D from Trader D over hit E from Trader E. Thus, trading platform 50 may offer the remaining 420 shares of hit D to Trader B and/or Trader C before trading platform 50 executes a transaction involving a portion of hit E from Trader E.

Figure 2C:
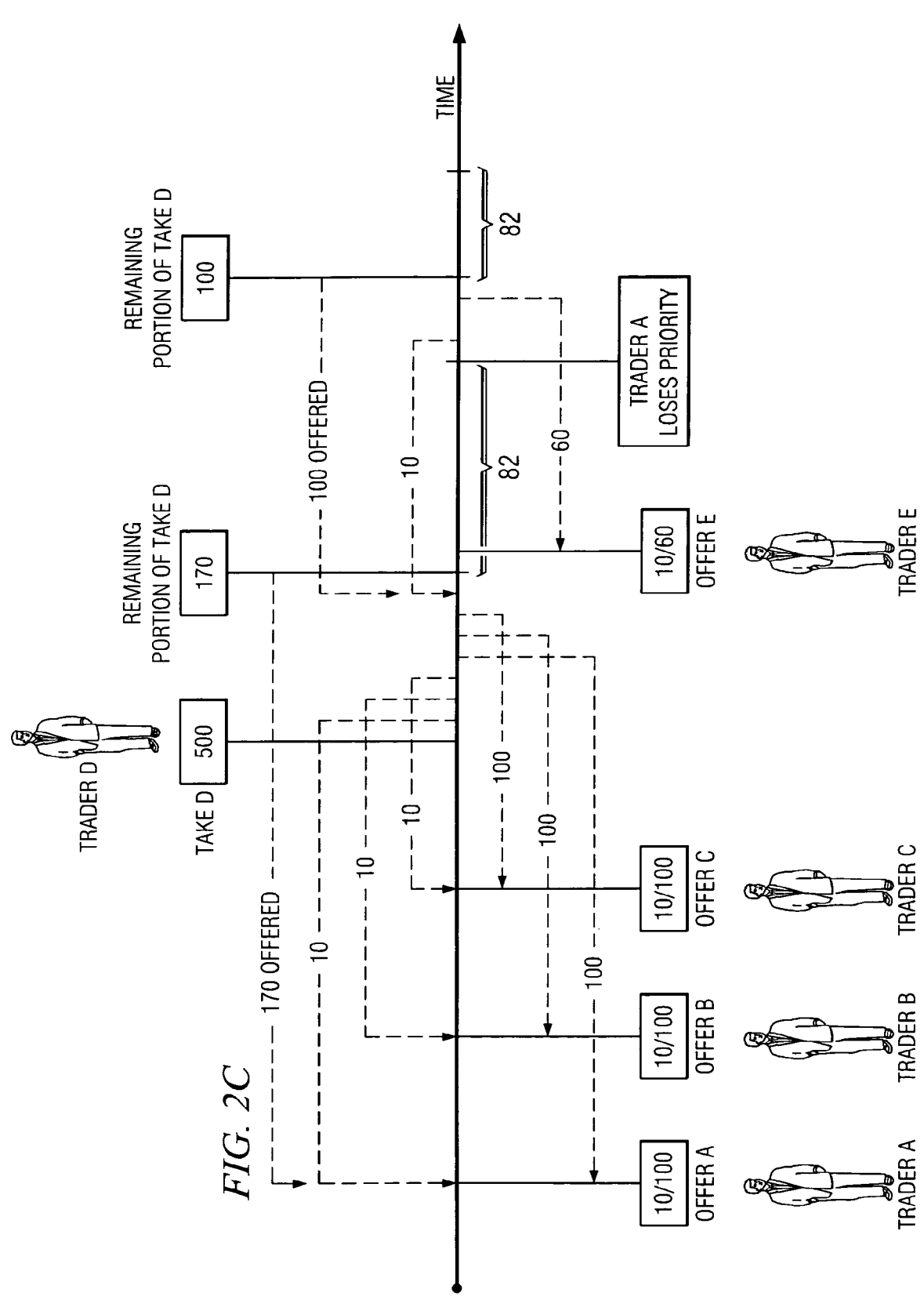
FIG. 2C illustrates an example timeline for matching trading orders according to one embodiment of the present invention.

FIG. 2C illustrates yet another example timeline for processing trading orders 12. In this example, logic 62 in trading platform 50 comprises rules 62 for processing a follow-on order 12*a*. If the received orders 12*a* are for a particular trading product, a follow-on order 12*a* is an order 12*a* for the particular trading product that is received after counterorder 12*b*. In the present example, trading platform 50 comprises six rules 62—Rules 62*a*-62*f* Rule 62*a* directs trading platform 50 to use counterorder 12*b* to fill the display portion of each of the plurality of orders 12*a* according to the sequence in which the orders 12*a* were received by trading platform 50. Once the display portions of the received orders 12*a* are filled, Rule 62*b* directs trading platform 50 to fill the reserve portion of each of the plurality of orders 12*a* according to the sequence in which the orders 12*a* were received by trading platform 50. Once the reserve portions of the received orders 12*a* are filled, Rule 62*c* directs trading platform 50 to exclusively offer to the priority trader 70, for a configurable priority period 82, any remaining portion of counterorder 12*b*. If the priority trader 70 does not accept during priority period 82 the remaining portion of counterorder 12*b*, then Rule 62*d* directs trading platform 50 to use the remaining portion of counterorder 12*b* to fill the displayed portions of any follow-on orders 12*a* according to the sequence in which trading platform 50 received the follow-on orders 12*a*. Once the display portions of the follow-on orders 12*a* are filled, Rule 62*e* directs trading platform to use the remaining portion of counterorder 12*b* to fill the reserve portion the follow-on orders 12*a* according to the sequence in which trading platform 50 received the follow-on orders 12*a*. Rule 62*f* then directs trading platform 50 to exclusively offer to trader 70 associated with the first follow-on order 12*a*, for a configurable priority period 82, any remaining portion of counterorder 12*b*.

In the present example, trading platform 50 receives from Trader A offer A of 110 shares of product X. Offer A is configured with a display portion of 10 shares and a reserve portion of 100 shares. Subsequently, trading platform 50 receives from Trader B offer B of 110 shares of product X. Trading platform 50 then receives from Trader C offer C of 110 shares of product X. Offers B and C are each configured with a display portion of 10 shares and a reserve portion of 100 shares. After receiving offer C, trading platform receives from Trader D a particular counterorder 12b—take D—for 500 shares of product X.

In the present example, based on Rule 62a, trading platform 50 uses take D to satisfy the display portions of offers A, B, and C (i.e., 10 shares each) based on the sequence in which trading platform 50 received offers A, B, and C. Based on Rule 62b, after satisfying the display portions of offers A, B, and C, trading platform 50 uses take D to satisfy the reserve portions of offers A, B, and C (i.e., 100 shares each) based on the sequence in which trading platform 50 received offers A, B, and C. At this point, the remaining portion of take D is 170 shares. Based on Rule 62c, trading platform 50 exclusively offers to Trader A for priority period 82 the remaining portion of take D. During priority period 82, trading platform 50 receives from Trader E a particular follow-on order 12a—offer E—for 70 shares of product X. Offer E is configured with a display portion of 10 shares and a reserve portion of 60 shares.

In the present example, Trader A fails to execute a trade for the remaining portion of take D prior to the expiration of priority period 82. Consequently, Trader A loses priority status. Based on Rules 62d and 62e, trading platform 50 then uses the remaining portion of take D to satisfy the display portion and the reserve portion of offer E (i.e., 10 shares and 60 shares, respectively). At this point, the remaining portion of take D is 100 shares. Based on Rule 62f, trading platform 50 then exclusively offers to Trader E, for priority period 82, the remaining portion of take D.

Figure 2D:
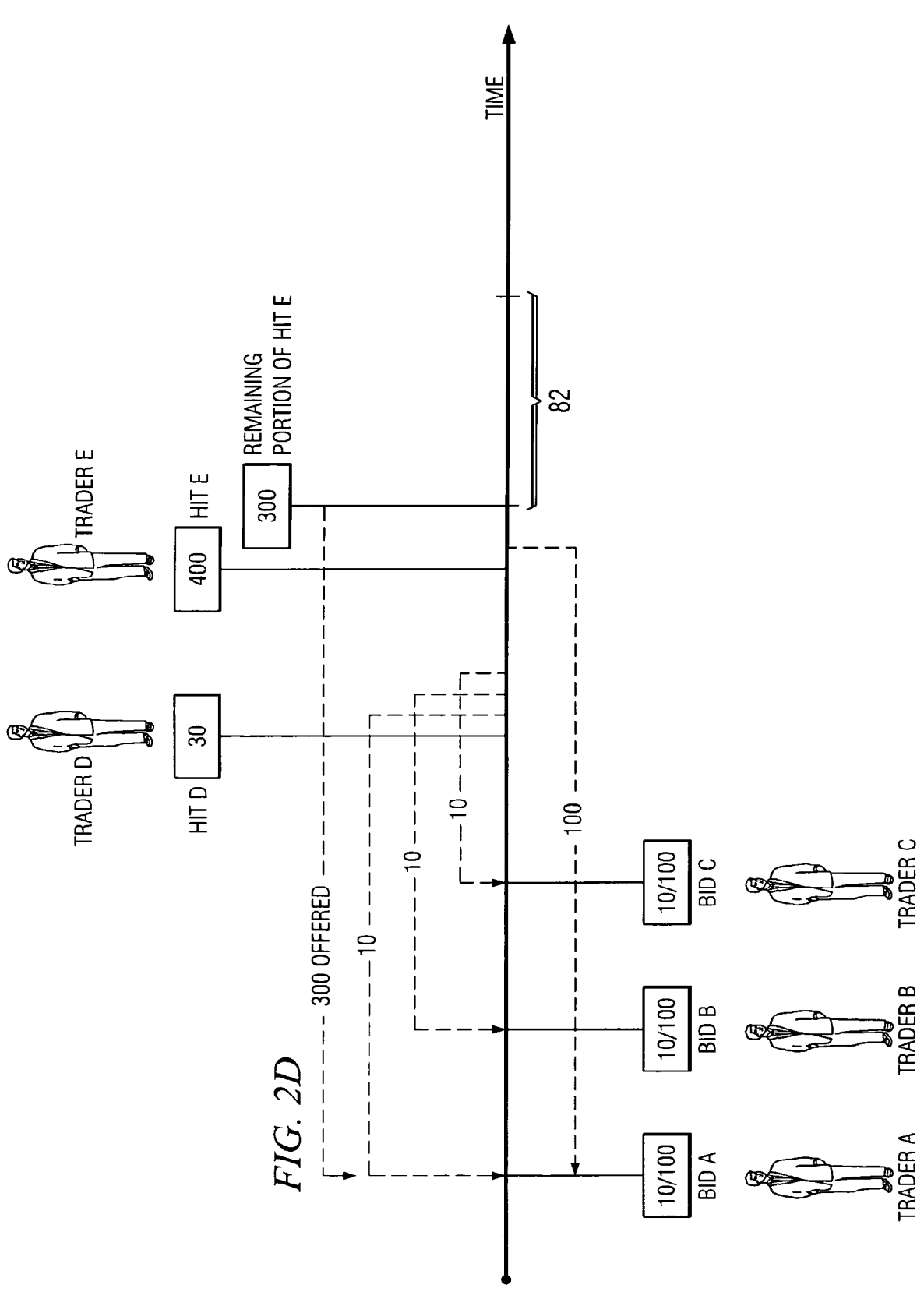
FIG. 2D illustrates an example timeline for matching trading orders according to another embodiment of the present invention.

FIG. 2D illustrates yet another example timeline for processing trading orders 12. In this example, trading platform 50 comprises rules 62 for processing a follow-on counterorder 12b. As explained above, a follow-on counterorder 12b is a particular counterorder 12b received by trading platform 50 after the initial counterorder 12b.

In the present example, trading platform 50 comprises four rules—Rules 62a-62d. Rule 62a directs trading platform 50 to use counterorder 12b to fill the display portion of each of the plurality of orders 12a according to the sequence in which the orders 12a were received by trading platform 50. Once the display portions of the received orders 12a are filled, Rule 62b directs trading platform 50 to fill the reserve portion of each of the plurality of orders 12a according to the sequence in which the orders 12a were received by trading platform 50. Once the reserve portions of the received orders 12a are filled, Rule 62c directs trading platform 50 to exclusively offer to the priority trader 70, for a configurable priority period 82, any remaining portion of counterorder 12b. Rule 62d directs that, if counterorder 12b filled the display portions of all received orders 12a but was exhausted prior to filling the reserved portion of the first order 12a, trading platform 50 uses a follow-on counterorder 12b to fill the reserve portion of the first order 12a and then exclusively offers, for a configurable priority period 82, any remaining portion of the follow-on counterorder to the particular trader 70 associated with the first order 12a.

In the present example, trading platform 50 receives from Trader A bid A for 110 shares of product X. Order A is configured with a display portion of 10 shares and a reserve portion of 100 shares. Subsequently, trading platform 50 receives from Trader B bid B for 110 shares of product X. Trading platform 50 then receives from Trader C bid C for 110 shares of product X. Bids B and C are each configured with a display portion of 10 shares and a reserve portion of 100 shares. After receiving bid C, trading platform receives from Trader D a particular counterorder 12b—hit D—of 30 shares of product X.

In the present example, based on Rule 62a, trading platform 50 uses all 30 shares of hit D to fill the display portions of bids A, B, and C (i.e., 10 shares each). Subsequently, trading platform 50 receives from Trader E a follow-on counterorder 12b—hit E—of 400 shares of product X. Based on Rule 62d, trading platform 50 uses 100 shares of hit E to fill the reserve portion of bid A. Trading platform 50 then exclusively offers, for priority period 82, the remaining 300 shares of product X from hit E to Trader A.

Figure 2E:
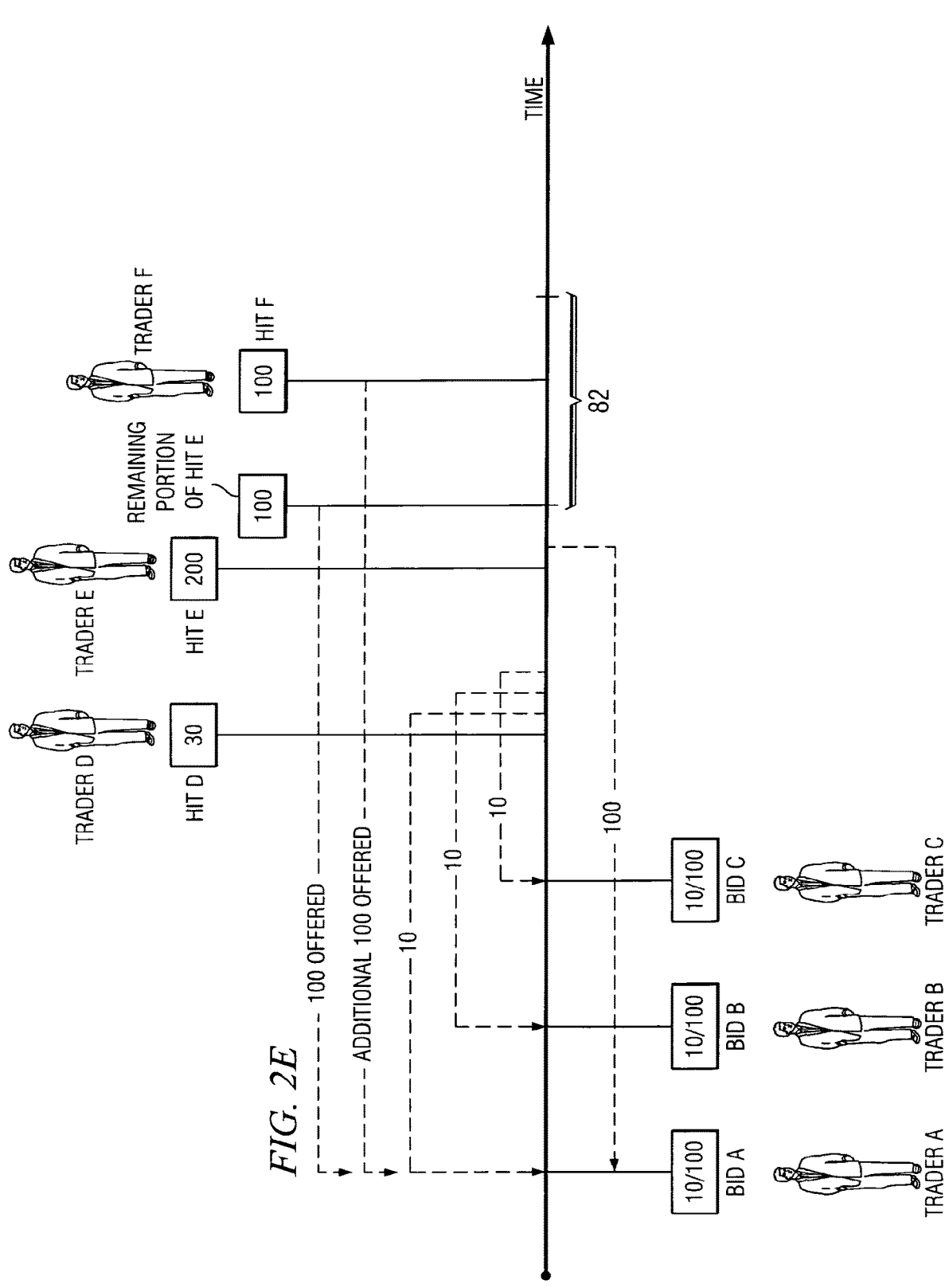
FIG. 2E illustrates an example timeline for matching trading orders according to yet another embodiment of the present invention.
Figure 3A:
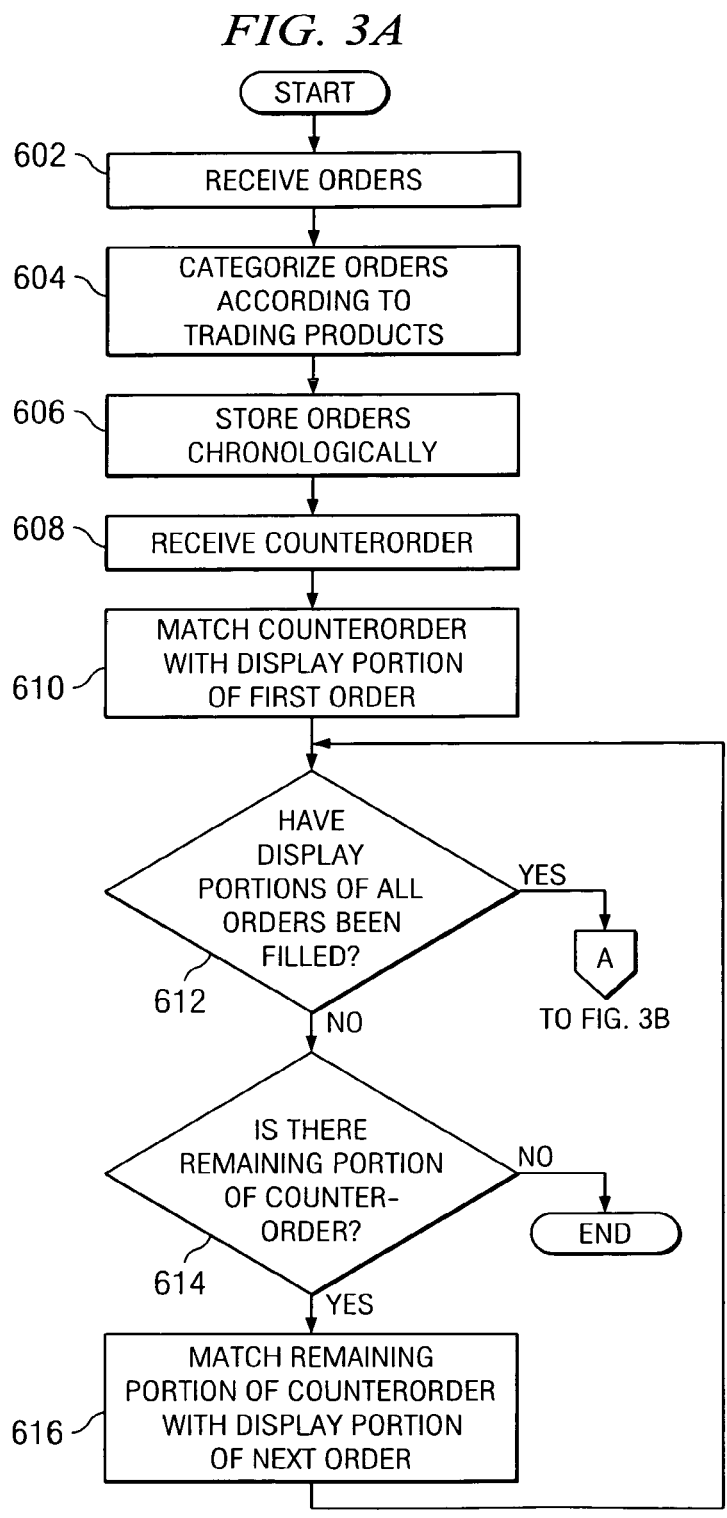
FIGS. 3A to 3D illustrate a flowchart for matching trading orders according to one embodiment of the present invention.
Figure 3B:
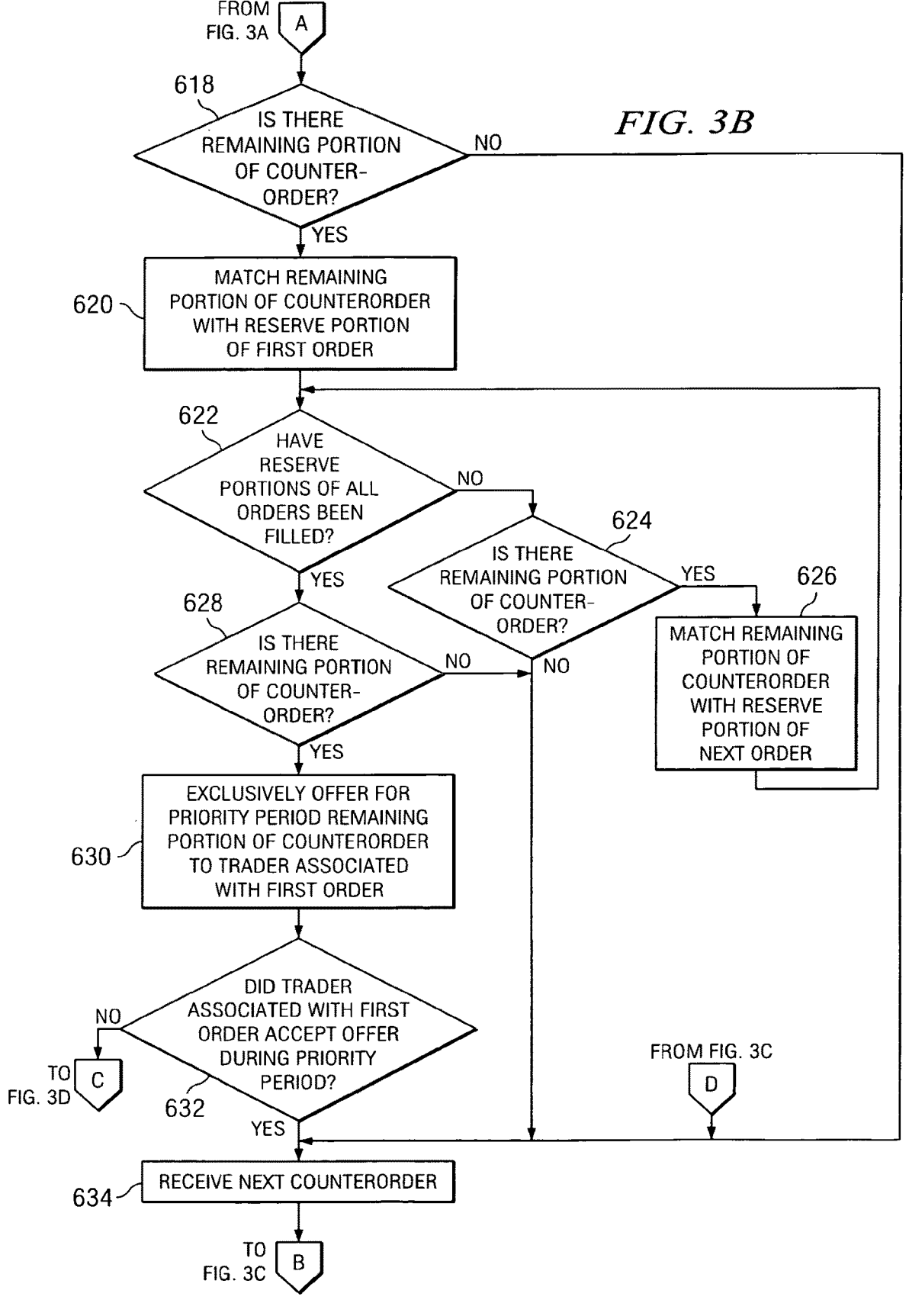
Figure 3C:
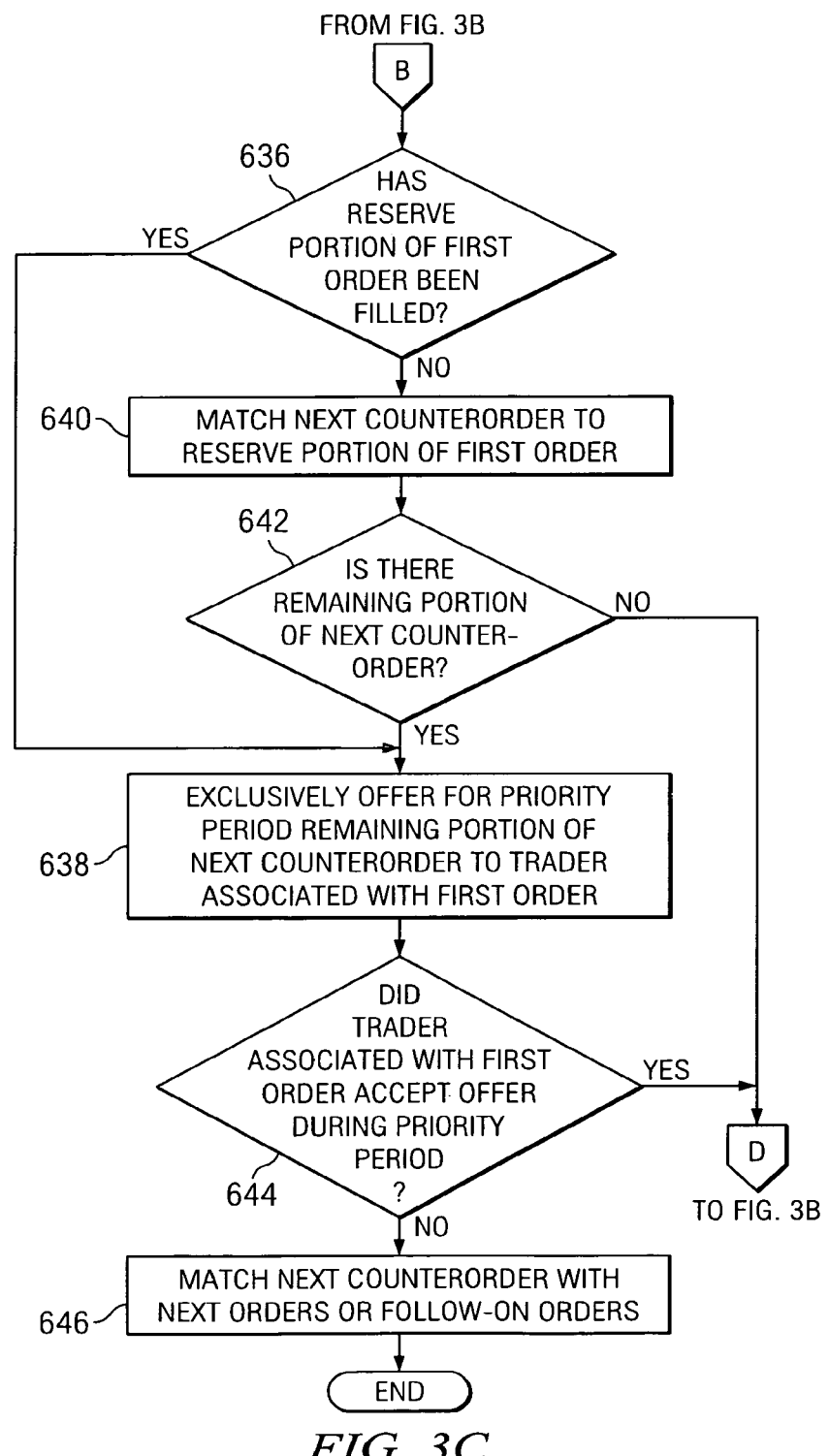
Figure 3D:
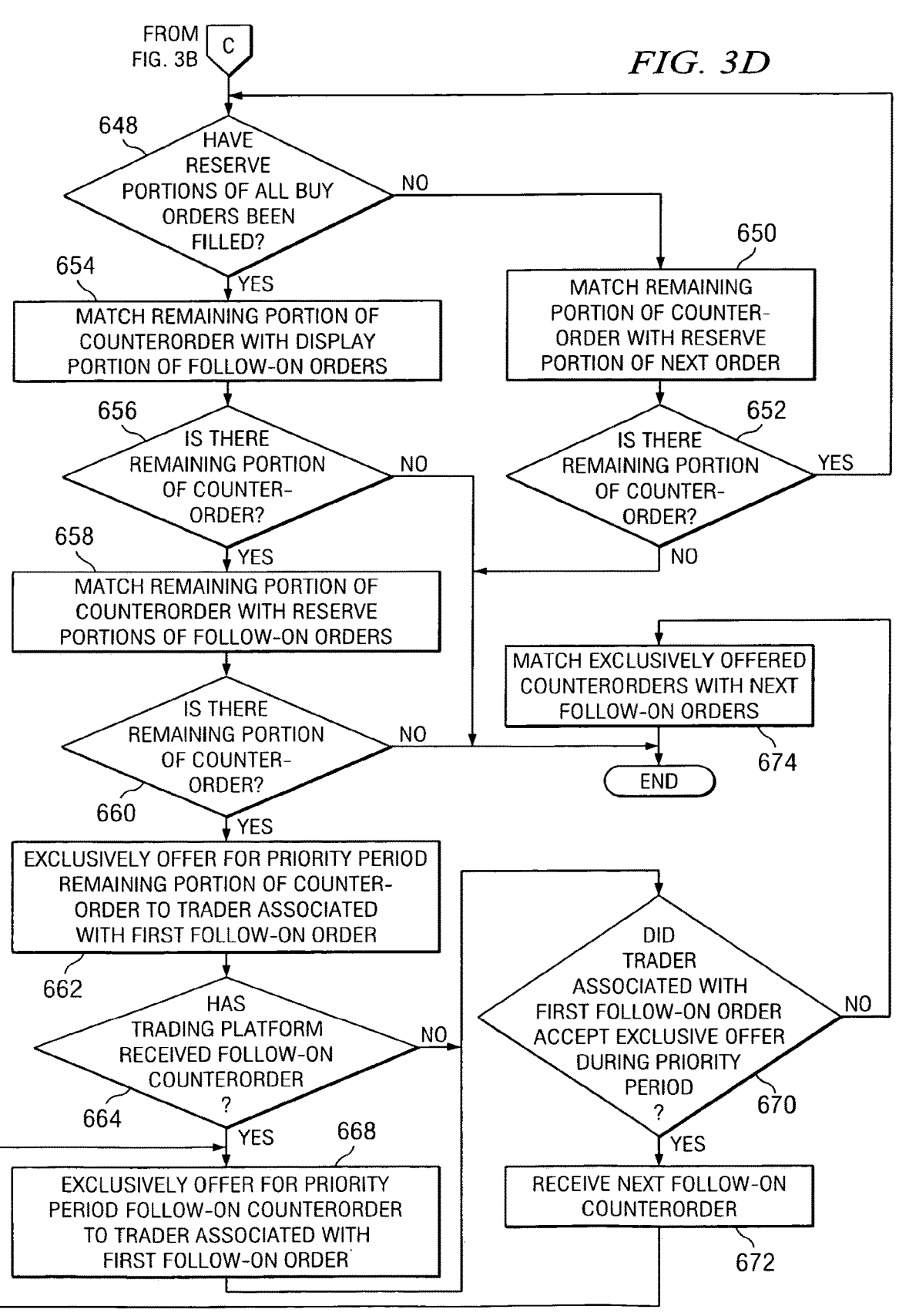

FIG. 2E illustrates yet another example timeline for processing trading orders 12 according to certain embodiments. In this example, trading platform 50 may process multiple follow-on counterorders 12b. In the present example, trading platform 50 comprises the same four rules (Rules 62a-62d) described above with respect to FIG. 2D. In addition, trading platform 50 comprises Rule 62e, which directs trading platform 50 to exclusively offer for priority period 82 to the priority trader 70 any follow-on counterorders 12b received after the first follow-on counterorder 12b and prior to the end of priority period 82.

The circumstances of the present example are the same as described above with respect to FIG. 2D. In this example, however, during priority period 82 involving Trader A and Trader E, trading platform 50 receives from Trader F a follow-on counterorder 12b—hit F—of 100 shares of product X. As a result, based on Rule 62e, trading platform 50 offers, during priority period 82, the 100 shares from hit F to Trader A in addition to the 100 shares from hit E.

In the examples illustrated in FIGS. 2A-2E, orders 12a and counterorders 12b were for shares of product X. It should be understood, however, that orders 12a and counterorders 12b may be for any suitable trading product such as, for example, currencies, financial instruments, stocks, bonds, futures contracts, equity securities, mutual funds, options, derivatives, commodities or any number and combination of suitable trading products.

The foregoing examples illustrate orders 12a and counterorders 12b that are bids, offers, hits, and takes. It should be understood, however, that orders 12a and counterorders 12b may be any suitable type of trading order 12 such as, for example, buy orders, sell orders, market orders, limit orders, stop loss orders, day orders, open orders, GTC ("good till cancelled") orders, "good through" orders, "all or none" orders, "any part" orders, or any other suitable order for trading.

The example timelines illustrated in FIGS. 2A-2E are not drawn to scale. These timelines are intended to depict sequences of events according to certain embodiments. It should be understood that certain events that are depicted in the timelines as occurring sequentially may, in some embodiments, occur substantially simultaneously. It will be further understood that the events depicted in these timelines may be separated by any amount of time or may occur substantially simultaneously. For example, the filling of the display portion of the bid B may occur simultaneously with, microseconds after, minutes after, or any suitable amount of time after the filling of the display portion of bid A.

The foregoing examples illustrate orders 12a and counterorders 12b that are for particular quantities of a trading product. It should be understood, however, that orders 12a and counterorders 12b may be for any suitable quantities of any suitable trading products.

In some of the foregoing examples, the priority trader 70 responded to an exclusive offer by accepting the offered portion of counterorder 12b. In some embodiments, however, the priority trader 70 may respond to an exclusive offer of a portion of counterorder 12*b* by requesting from the counterparty trader 70 associated with counterorder 12*b* an amount greater than the portion of counterorder 12*b* that is exclusively offered. According to certain embodiments, if the counterparty trader 70 fulfills the request for the greater amount, than the counterparty trader 70 retains priority status (e.g., counter priority period 83 is extended), but if the counterparty trader 70 does not fulfill the request for the greater amount, then the counterparty trader 70 loses priority (e.g., counter priority period 83 is not extended).

FIGS. 3A to 3D illustrate a flowchart for matching trading orders 12. The method starts at step 602 where trading platform 50 receives one or more orders 12*a*. At step 604, processor 56 categorizes orders 12*a* according to the trading product associated with each order 12*a*. At step 606, processor 56 stores orders 12*a* in memory module 60 in accordance with the sequence in which trading platform 50 received each order 12*a*. At step 608, trading platform 50 receives counterorder 12*b* for a particular trading product. Processor 56 identifies those orders 12*a* in memory module 50 that are associated with the same trading product as counterorder 12*b*. The orders 12*a* identified by processor 56 may be referred to as "identified" orders 12*a*.

At step 610, processor 56 matches counterorder 12*b* with the display portion of the first identified order 12*a*. The first identified order 12*a* is the first order 12*a* received by trading platform 50 for the same trading product as counterorder 12*b*. At decisional step 612, processor 56 determines whether the display portion of each identified order 12*a* has been filled. If the display portion of each identified order 12*a* has not been filled, then at decisional step 614 processor 56 determines whether there is any remaining portion of counterorder 12*b*. If processor 56 determines that there is no remaining portion of counterorder 12*b* at decisional step 614, then the method ends. However, if processor 56 determines that there is a remaining portion of counterorder 12*b* at decisional step 614, then at step 616 processor 56 matches the remaining portion of counterorder 12*b* with the display portion of the next identified order 12*a*. The next identified order 112 is the particular identified order 12*a* that was next received by trading platform 50 and that has not yet had its display portion filled. Once processor 56 matches the remaining portion of counterorder 12*b* with the display portion of the next identified order 12*a*, the method returns to decisional step 612.

If processor 56 determines at decisional step 612 that the display portions of each identified order 12*a* has been filled, then at decisional step 618 processor 56 determines whether there is any remaining portion of counterorder 12*b*. If processor 56 determines at decisional step 618 that there is no remaining portion of counterorder 12*b*, then the method proceeds to step 634. However, if processor 56 determines at decisional step 618 that there is a remaining portion of counterorder 12*b*, then at step 620 processor 56 matches the remaining portion of counterorder 12*b* with the reserve portion of the first identified order 12*a*. At decisional step 622, processor 56 determines whether the reserve portions of each identified order 12*a* has been filled. If processor 56 determines at decisional step 622 that the reserve portions of each identified order 12*a* has not been filled, then at decisional step 624 processor 56 determines whether there is any remaining portion of counterorder 12*b*.

If processor 56 determines at decisional step 624 that there is no remaining portion of counterorder 12*b*, then the method proceeds to step 634. However, if processor 56 determines at decisional 624 that there is a remaining portion of counterorder 12*b*, then at step 626 processor 56 matches the remaining portion of counterorder 12*b* with the reserve portion of the next identified order 12*a*. The method then returns back to decisional step 622.

If processor 56 determines at decisional step 622 that the reserve portions of all identified orders 12*a* have been filled, then at decisional step 628 processor 56 determines whether there is any remaining portion of counterorder 12*b*. If processor 56 determines at decisional step 628 that there is no remaining portion of counterorder 12*b*, then the method proceeds to step 634. However, if processor 56 determines at decisional step 628 that there is a remaining portion of counterorder 12*b*, then at step 630 processor 56 exclusively offers for priority period 82 the remaining portion of counterorder 12*b* to the particular trader 70 associated with the first identified order 12*a*.

At decisional step 632, processor 56 determines whether trader 70 associated with the first identified order 12*a* accepted during priority period 82 the exclusive offer of the remaining portion of counterorder 12*b*. If processor 56 determines at decisional step 632 that trader 70 associated with the first identified order 12*a* did not accept the exclusive offer during priority period 82, then the method continues to decisional step 640. However, if processor 56 determines at decisional step 632 that trader 70 associated with the first identified order 12*a* accepted the exclusive offer during priority period 82, then the method proceeds to step 634.

At step 634, trading platform 50 receives the next counterorder 12*b*. At decisional step 636, processor 56 determines whether the reserve portion of the first identified order 12*a* has been filled. If processor 56 determines at decisional step 636 that the reserve portion of the first identified order 12*a* has been filled, then the method proceeds to step 638. However, if processor 56 determines at decisional step 636 that the reserve portion of the first identified order 12*a* has not been filled, then at step 640 processor 56 matches the next counterorder 12*b* to the reserve portion of the first identified order 12*a*. At decisional step 642, processor 56 determines whether there is any remaining portion of the next counterorder 12*b*. If processor 56 determines at decisional step 642 that there is no remaining portion of the next counterorder 12*b*, then the method returns back to step 634. However, if processor 56 determines at decisional step 642 that there is a remaining portion of the next counterorder 12*b*, then at step 638 processor 56 exclusively offers for priority period 82 the next counterorder 12*b* to trader 70 associated with the first identified order 12*a*.

At decisional step 644, processor 56 determines whether trader 70 associated with the first identified order 12*a* accepted the exclusive offer of the next counterorder 12*b* during priority period 82. If processor 56 determines at decisional step 644 that trader 70 associated with the first identified order 12*a* accepted the exclusive offer during priority period 82, then the method returns back to step 634. However, if processor 56 determines at decisional step 644 that trader 70 associated with the first identified order 12*a* did not accept the exclusive offer during priority period 82, then at step 646 processor 56 matches the next counterorder 12*b* with the next identified order 12*a* or any follow on orders 12*a*.

Returning to decisional step 632, if the processor 56 determines at that step that trader 70 associated with the first identified order 12*a* did not accept the exclusive offer during priority period 82, then at decisional step 648 processor 56 determines whether the reserve portion of all identified orders 12*a* have been filled. If processor 56 determines at decisional step 648 that the reserve portions of all identified orders 12*a* have not been filled, then at step 650 processor 56 matches the remaining portion of counterorder 12*b* with the reserve portion of the next identified order 12*a*. At decisional step 652, processor 56 determines whether there is any remaining portion of counterorder 12*b*. If processor 56 determines at decisional step 652 that there is no remaining portion of counterorder 12*b*, then the method ends. However, if processor 56 determines at decisional step 652 that there is a remaining portion of counterorder 12*b*, then the method returns back to decisional step 648.

At decisional step 648, if processor 56 determines that the reserve portions of all identified orders 12*a* have been filled, then at step 654 processor 56 matches the remaining portion of counterorder 12*b* with the display portion of follow-on buy orders 12*a* associated with the same trading product as counterorder 12*b*. At decisional step 656, processor 56 determines whether there is any remaining portion of counterorder 12*b*. If processor 56 determines at decisional step 656 that there is no remaining portion of counterorder 12*b*, then the method ends. However, if processor 56 determines at decisional step 656 that there is a remaining portion of counterorder 12*b*, then at step 658 processor 56 matches the remaining portion of counterorder 12*b* to the reserve portions of follow-on orders 12*a*.

At decisional step 660, processor 56 determines whether there is any remaining portion of counterorder 12*b*. If processor 56 determines at decisional step 660 that there is no remaining portion of counterorder 12*b*, then the method ends. However, if processor 56 determines at decisional step 660 that there is a remaining portion of counterorder 12*b*, then at step 662 processor 56 exclusively offers for a priority period the remaining portion of counterorder 12*b* to trader 70 associated with the first follow-on order 12*a*. At decisional step 664, processor 56 determines whether trading platform 50 has received an additional follow-on counterorder 12*b*. If processor 56 determines at decisional step 664 that trading platform 50 has not received an additional follow-on counterorder 12*b*, then the method proceeds to decisional step 670. However, if processor 56 determines at decisional step 664 that trading platform 50 has received an additional follow-on counterorder 12*b*, then at step 668 processor 56 exclusively offers for priority period 82 the additional follow-on counterorder 12*b* to trader 70 associated with the first follow-on order 12*a*.

At decisional step 670, processor 56 determines whether trader 70 associated with the first follow-on order 12*a* accepted the exclusive offer during priority period 82. If processor 56 determines at decisional step 670 that trader 70 associated with the first follow-on order 12*a* did not accept the exclusive offer during priority period 82, then at step 672 processor 56 matches the exclusively offered counterorder (s) 12*b* (follow-on or otherwise) to the next follow-on order(s) 12*a*. However, if at decisional step 670 processor 56 determines that trader 70 associated with the first follow-on order 12*a* accepted the exclusive offer during priority period 82, then at step 672 processor 56 waits to receive the next follow-on counterorder 12*b*. The method then returns back to step 668.

Although the present invention has been described in several embodiments, a myriad of changes and modifications may be suggested to one skilled in the art, and it is intended that the present invention encompass such changes and modifications as fall within the scope of the present appended claims.

The invention claimed is:

1. An apparatus comprising:
at least one processor configured to control:

receiving, over a communication network, a first trading order for a trading product via a computing device of a first trader, in which the first trading order includes a display portion and a reserve portion, and wherein the display portion of the first trading order is displayed on at least one interface screen of at least one display device of at least one first trading workstation, wherein the first trading order is an offer;

receiving, over the communication network, a second trading order for the trading product via at least one computing device of at least one second trader, in which each second trading order is received subsequently to the first trading order, in which each second trading order includes a display portion and a reserve portion, and wherein the display portion of each second trading order is displayed on at least one interface screen of at least one electronic display device of at least one second trading workstation, wherein each second trading order is an offer;

receiving, over the communication network, from a computing device of a counterparty trader, a counterorder for the trading product, wherein the counterorder is a take;

automatically filling the display portion of the first trading order using the counterorder;

automatically filling the display portion of each second trading order using the counterorder;

after automatically filling the display portion of each second trading order and based on the first trading order being received before each second trading order, exclusively offering, over the communication network, at at least one remote computing device, at least a portion of the counterorder to the first trader for a configurable period of time without offering any portion of the counterorder to any second trader until at least the configurable period of time expires and preventing the reserve portion of the first trading order from being disclosed to given traders with the exception of the counterparty trader;

receiving from the first trader an acceptance of at least a part of the at least a portion of the counterorder during the configurable period of time; and responsive to receiving the acceptance, exclusively offering a second part of a remaining portion of the counterorder to the first trader for filling from the reserve portion of the first trading order for an extended configurable period of time.

2. The apparatus of claim 1, wherein the at least one processor is configured to control:
after receiving the first trading order,
disclosing the display portion of the first trading order to the given traders.

3. The apparatus of claim 1, wherein automatically filling the display portion of the first trading order using the counterorder comprises satisfying the display portion of the first trading order with a corresponding portion of the counterorder.

4. The apparatus of claim 1, wherein the at least one processor is configured to control:
after filling the display portion of each second trading order and prior to exclusively offering at least part of the counterorder, automatically filling the reserve portion of the first trading order using the counterorder.

5. The apparatus of claim 1, wherein the at least one processor is configured to control:

after filling the display portion of each second trading order and prior to exclusively offering at least part of the counterorder:

automatically filling the reserve portion of the first trading order using the counterorder; and automatically filling the reserve portion of each second trading order using the counterorder.

6. A non-transitory computer-readable medium configured to store instructions which, when executed by at least one processor, control:

receiving, over a communication network, a first trading order for a trading product via a computing device of a first trader, in which the first trading order includes a display portion and a reserve portion, and wherein the display portion of the first trading order is displayed on at least one interface screen of at least one display device of at least one first trading workstation, wherein the first trading order is an offer;

receiving, over the communication network, a second trading order for the trading product via at one computing device of at least one second trader, in which each second trading order is received subsequently to the first trading order, in which each second trading order includes a display portion and a reserve portion, and wherein the display portion of each second trading order is displayed on at least one interface screen of at least one electronic display device of at least one second trading workstation, wherein each second trading order is an offer;

receiving, over the communication network, from a computing device of a counterparty trader, a counterorder for the trading product, wherein the counterorder is a take;

automatically filling the display portion of the first trading order using the counterorder;

automatically filling the display portion of each second trading order using the counterorder;

after automatically filling the display portion of each second trading order and based on the first trading order being received before each second trading order, exclusively offering, over the communication network, at at least one remote computing device, at least a portion of the counterorder to the first trader for a configurable period of time without offering any portion of the counterorder to any second trader until at least the configurable period of time expires and preventing the reserve portion of the first trading order from being disclosed to given traders with the exception of the counterparty trader;

receiving from the first trader an acceptance of at least a part of the at least a portion of the counterorder during the configurable period of time; and responsive to receiving the acceptance, exclusively offering a second part of a remaining portion of the counterorder to the first trader for filling from the reserve portion of the first trading order for an extended configurable period of time.

7. The non-transitory computer-readable medium of claim 6, wherein the instructions, when executed by the at least one processor, control:

after receiving the first trading order, disclosing the display portion of the first trading order to the given traders.

8. The non-transitory computer-readable medium of claim 6, wherein using the counterorder to fill the display portion of the first trading order comprises satisfying the display portion of the first trading order with a corresponding portion of the counterorder.

9. The non-transitory computer-readable medium of claim 6, wherein the instructions, when executed by the at least one processor, control:

after filling the display portion of each second trading order and prior to exclusively offering at least part of the counterorder, automatically filling the reserve portion of the first trading order using the counterorder.

10. The non-transitory computer-readable medium of claim 6, wherein the instructions, when executed by the at least one processor, control:

after filling the display portion of each second trading order and prior to exclusively offering at least part of the counterorder:

automatically filling the reserve portion of the first trading order using the counterorder; and automatically filling the reserve portion of each second trading order using the counterorder.

11. An apparatus comprising:

at least one processor configured to control:

receiving, over a communication network, a first trading order for a trading product via a computing device of a first trader, in which the first trading order includes a display portion and a reserve portion, and wherein the display portion of the first trading order is displayed on at least one interface screen of at least one display device of at least one first trading workstation, wherein the first trading order is a bid;

receiving, over the communication network, a second trading order for the trading product via at least one computing device of at least one second trader, in which each second trading order is received subsequently to the first trading order, in which each second trading order includes a display portion and a reserve portion, and wherein the display portion of each second trading order is displayed on at least one interface screen of at least one electronic display device of at least one second trading workstation, wherein each second trading order is a bid;

receiving, over the communication network, from a computing device of a counterparty trader, a counterorder for the trading product, wherein the counterorder is a hit;

automatically filling the display portion of the first trading order using the counterorder;

automatically filling the display portion of each second trading order using the counterorder;

after automatically filling the display portion of each second trading order and based on the first trading order being received before each second trading order, exclusively offering, over the communication network, at least one remote computing device, at least a portion of the counterorder to the first trader for a configurable period of time without offering any portion of the counterorder to any second trader until at least the configurable period of time expires and preventing the reserve portion of the first trading order from being disclosed to given traders with the exception of the counterparty trader;

receiving from the first trader an acceptance of at least a part of the at least a portion of the counterorder during the configurable period of time; and responsive to receiving the acceptance, exclusively offering a second part of a remaining portion of the counterorder to the first trader for filling from the reserve portion of the first trading order for an extended configurable period of time.

\* \* \* \* \*